UNITED STATES PATENT OFFICE.

GEORGE WILLIAM EDDISON, OF NEW YORK, N. Y.

FIRE-EXTINGUISHING COMPOUND.

SPECIFICATION forming part of Letters Patent No. 327,929, dated October 6, 1885.

Application filed January 6, 1885. Serial No. 152,174. (No specimens.)

*To all whom it may concern:*

Be it known that I, GEORGE WILLIAM EDDISON, a resident of New York, county of New York, and State of New York, have invented certain new and useful Improvements in Fire-Exterminating Compounds, of which the following is a full, clear, and exact description.

Take of vinegar, ten gallons; oil of vitriol, ten pounds; sulphate of copper, one pound; chloride of zinc, one pound; sulphate of ammonium, one pound; chloride of potassium, one pound; alum, one pound; phosphorus, one pound. Mix the ingredients together very slowly in the order named above, and should effervescence take place discontinue until it ceases. Then proceed as before until all the ingredients have become assimilated. Then decant in green glass bottles or jars or rubber bags.

Should a fire occur, throw the compound upon the flames, and the action of the compound upon the flames completely and rapidly exterminates the fire.

Having fully described my invention, what I claim, and desire to secure by Letters Patent of the United States, is—

The herein-described composition of matter to be used for exterminating fires, consisting of vinegar, oil of vitriol, sulphate of copper, chloride of zinc, sulphate of ammonium, chloride of potassium, alum, and phosphorus, in the proportions specified.

In testimony that I claim the foregoing I have hereunto set my hand in the presence of two witnesses.

GEORGE WILLIAM EDDISON.

Witnesses:
HENRY M. HENDERSON,
WILLIAM H. B. BROWN.